M. L. DONOVAN.
LUBRICATOR.
APPLICATION FILED APR. 1, 1919.
1,329,229.
Patented Jan. 27, 1920.
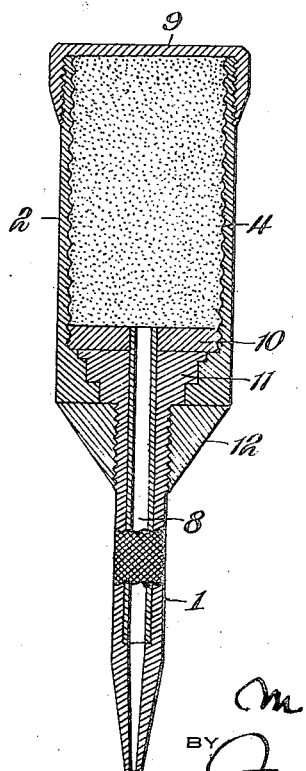
INVENTOR
M. L. Donovan
BY James J. Sheely & Co.
ATTORNEYS

UNITED STATES PATENT OFFICE.

MICHAEL L. DONOVAN, OF OMAHA, NEBRASKA.

LUBRICATOR.

1,329,229.

Specification of Letters Patent.  Patented Jan. 27, 1920.

Application filed April 1, 1919. Serial No. 286,669.

*To all whom it may concern:*

Be it known that I, MICHAEL L. DONOVAN, a citizen of the United States, residing at Omaha, in the county of Douglas and State of Nebraska, have invented new and useful Improvements in Lubricators, of which the following is a specification.

My present invention pertains to grease guns, and it contemplates the provision of a grease gun that may be easily and readily filled and one from which lubricant may be forced with but a small amount of effort on the part of a person practising the invention.

The invention in all of its details will be fully understood from the following description and claims when the same are read in connection with the drawing accompanying and forming part of this specification in which:—

The figure illustrates in section a grease gun formed in accordance with my invention.

As illustrated by the drawings, the grease gun comprises a reservoir or lubricant holding body 2 to which a filling cover 9 is threaded and said body at its lower end is secured on a portion that is gradually reduced in diameter so as to enter a bearing of an automobile as indicated by 12.

At its lower end I provide the gun with a conduit or base portion 1, having an interior channel 8 that extends throughout the length of the portion 1. At its upper end said portion 1 is provided with a stepped head member 11.

As will be seen by reference to the drawing, the reservoir 2 is interiorly threaded at 4 and said threads extend approximately throughout the length of the reservoir; also the reduced portion 12 is provided with interior threads.

Within the reservoir 2 and immediately above the head 11 of conduit 1 I arrange a plate 10 that engages the conduit and threads 4 as illustrated.

I would have it understood that the reduced end 12 of the reservoir may be formed of wood so as to be tightly forced into the opening of a bearing of an automobile.

It is further to be understood that the conduit is to be interiorly threaded to engage the reduced portion of reservoir 2.

In the practical use of the device when the conduit 1 enters a bearing, the reservoir 2 is turned on the plate 10 and head 11 of said conduit, thus causing them to travel upward in the reservoir whereby lubricant will be forced through the channel 8 of the conduit. When it is desired to refill the reservoir, it is simply necessary to remove the cover 9, when lubricant may be readily placed in the gun.

It will be gathered from the foregoing that the reservoir 2 and portion 12 will move downwardly whereas the stem 1 and plate 10 will remain stationary when pressure of the reservoir 2 on the lubricant will force same through channel 8 of said stem 1.

Having described my invention, what I claim and desire to secure by Letters-Patent is:

1. In a grease gun, the combination of a reservoir, a conduit having a stepped upper end, a plate mounted on the conduit above the stepped upper end thereof, and means on the plate and reservoir for retaining the plate in proper position in said reservoir, and a filling cap arranged on the reservoir.

2. In a grease gun, the combination of a conduit, an adjustable reservoir secured thereon, a downwardly tapered portion adjustably secured to the conduit and on which the reservoir bears, a follower arranged to move upwardly and downwardly in the reservoir and means for permitting lubricant to be placed in the reservoir.

3. In a grease gun, the combination of a reservoir for lubricant having interior threads, a downwardly tapered portion arranged below the reservoir, and also having interior threads, a conduit having exterior threads that engage the threads of the tapered portion, a stepped upper portion provided on the conduit, and a follower arranged on the stepped upper portion and having exterior threads that engage the interior threads of the reservoir whereby the follower is retained in proper relation with respect to the reservoir and whereby also turning of the reservoir on the conduit will force lubricant through said conduit.

In testimony whereof I have hereunto set my hand in presence of two subscribing witnesses.

MICHAEL L. DONOVAN.

Witnesses:
 CHARLOTTE LORENZEN,
 W. L. BAUGH, Jr.